United States Patent [19]
Minakuchi et al.

[11] Patent Number: 5,760,944
[45] Date of Patent: Jun. 2, 1998

[54] SCANNING OPTICAL DEVICE

[75] Inventors: Tadashi Minakuchi; Masahiro Oono; Mitsunori Iima; Hiroshi Kanazawa, all of Tokyo, Japan

[73] Assignee: Asahi Kogaku Kogyo Kabushiki Kaisha, Tokyo, Japan

[21] Appl. No.: 791,983

[22] Filed: Jan. 31, 1997

[30] Foreign Application Priority Data

Jan. 31, 1996 [JP] Japan .................. 8-037266
Feb. 2, 1996 [JP] Japan .................. 8-040605

[51] Int. Cl.[6] .................................. G02B 26/08
[52] U.S. Cl. .................. 359/211; 359/209; 359/216; 250/234
[58] Field of Search .................. 359/209, 211, 359/216–219; 250/234–236; 347/258–261

[56] References Cited

U.S. PATENT DOCUMENTS

| | | | |
|---|---|---|---|
| 4,600,837 | 7/1986 | DiStefano et al. | 250/235 |
| 4,850,686 | 7/1989 | Morimoto et al. | 359/196 |
| 5,255,115 | 10/1993 | Kikuchi | 359/211 |
| 5,383,047 | 1/1995 | Guerin | 359/216 |
| 5,498,869 | 3/1996 | Appel et al. | 359/216 |

FOREIGN PATENT DOCUMENTS

| | | |
|---|---|---|
| 2198413 | 8/1990 | Japan . |
| 2240617 | 9/1990 | Japan . |
| 2140510 | 11/1990 | Japan . |

*Primary Examiner*—James Phan
*Attorney, Agent, or Firm*—Greenblum & Bernstein, P.L.C.

[57] ABSTRACT

A scanning optical device that includes a light source that emits a light flux; a polygon mirror for deflecting the light flux; a scanning lens for converging the light flux deflected by the polygon mirror to form a beam spot on an image surface; a dynamic prism that is rotatably disposed between the light source and the polygon mirror to affect the direction of the light flux; a driving mechanism for rotating the dynamic prism to change the deviation angle of the dynamic prism; and a controller for controlling the driving mechanism to change the position of the beam spot during scanning.

In particular, the controller rotates the dynamic prism to compensate for errors that affect the position of the beam spot on the image surface, such as errors that vary with time and errors that occur randomly during the scanning process.

14 Claims, 10 Drawing Sheets

SCANNING OPTICAL DEVICE

BACKGROUND OF THE INVENTION

The present invention relates to a scanning optical device used for a laser beam printer or the like.

A scanning optical device includes a laser source such as a semiconductor laser, a polygon mirror for deflecting a laser flux emitted from the laser source and an fθ lens that converges the laser flux onto an image surface such as a photoconductive drum to form scanning lines.

The position of the beam spot formed by the light flux on the image surface must be accurately controlled in order to form an accurate image on the image surface.

However, since each of the optical elements in the scanning optical device may include manufacturing errors and, further, the rotation of each of the polygon mirror and the photosensitive drum may be unstable, the beam spot position may deviate from the ideal position and the image will be distorted.

Although deviations of the beam spot can be reduced by increasing the manufacturing accuracy of the optical elements and by increasing the accuracy of the driving mechanism for the polygon mirror and the photoconductive drum, the cost, manufacturing time, and complexity involved are prohibitive for commercial scanning optical devices.

SUMMARY OF THE INVENTION

It is therefore an object of the present invention to provide a scanning optical device in which deviations of the beam spot caused by shape errors of a polygon mirror are reduced without increasing the manufacturing accuracy of optical elements or requiring more complicated driving mechanisms.

According to an aspect of the present invention, there is provided a scanning optical device that includes a light source that emits a light flux; a polygon mirror for deflecting the light flux; a scanning lens for converging the light flux deflected by the polygon mirror to form a beam spot on an image surface; a dynamic prism that is rotatably disposed between the light source and the polygon mirror to affect the direction of the light flux; a driving mechanism for rotating the dynamic prism to change a deviation angle of the dynamic prism; and a controller for controlling the driving mechanism to change the position of the beam spot during scanning.

With the arrangement above, the driving mechanism can be controlled to rotate the dynamic prism to compensate for various errors that affect the position of the beam spot on the image surface. In particular, the dynamic prism can be controlled to compensate for either or both of errors that vary with time and errors that occur randomly during the scanning process. For example, these errors might be facial or shape errors of the reflecting surfaces of the polygon mirror or drive errors that cause an uneven movement of the surface on which the image is formed.

In a particular case, the dynamic prism is disposed in an afocal optical path.

Preferably, the scanning optical device further includes a prism sensor for detecting a position of the dynamic prism so that the controller can control the driving mechanism using closed-loop control based on the output of the prism sensor.

In particular, the prism sensor may include a light emitting portion to emit a light beam toward a surface of the dynamic prism and a light receiving portion to receive the light beam

2 reflected from the surface. Further, the light receiving portion preferably includes a light receiving element that is provided with two light receiving areas divided by a boundary that is perpendicular to a moving direction of the reflected light due to a regular rotation of the dynamic prism by the driving mechanism.

If the light receiving portion is arranged with two light receiving areas as described, the prism sensor can more accurately detect the movement of the prism that affects the position of the bean spot.

Further preferably, the light receiving areas are rectangular and have long sides that are parallel to the boundary.

In a further particular case, the dynamic prism may be supported by an elastic member, such as a leaf spring.

In yet a further particular case, the dynamic prism is held by a prism holder and the prism holder is rotatably supported by a frame, and the driving mechanism includes a magnet that is fixed to the frame to form a magnetic circuit and a coil that surrounds the prism holder to generate a magnetic moment with respect to the magnetic circuit. In this case, the prism holder, rather than the prism, may be supported by a metal leaf spring with respect to the frame and the electric current may be supplied to the coil via the metal leaf spring.

In still yet a further particular case, the dynamic prism may affect the direction of the light flux in an auxiliary scanning direction. In this case, the controller may then control the driving mechanism in order to compensate for deviations of the beam spot due to tilting errors of the reflecting surfaces of the polygon mirror.

In a further particular case, the scanning optical device may further include an index signal generator for generating an index signal at least once per rotation of the polygon mirror, and a memory for storing data corresponding to shape errors of the reflecting surfaces. In this case, the controller controls the driving mechanism in order to compensate for deviations of the beam spot due to shape errors for each individual reflecting surface of the polygon mirror. In doing this, the controller determines which reflecting surface is currently used to deflect the light flux based on the index signal and controls the driving mechanism in accordance with data for the current reflecting surface read from the memory.

In yet a further particular case, the image surface may be a photoconductive drum and the controller may control the driving mechanism in order to compensate deviations of the beam spot due to unstable rotation of the photoconductive drum.

3

DETAILED DESCRIPTION OF THE PREFERRED EMBODIMENTS

A scanning optical device according to the present embodiment is described with reference to FIGS. 1 through 15. The embodiment described is directed to a multi-beam scanning optical device that scans a plurality of laser fluxes across a predetermined angle producing eight scanning lines per scan on a surface, such as the surface of a photoconductive member.

Figure 1:
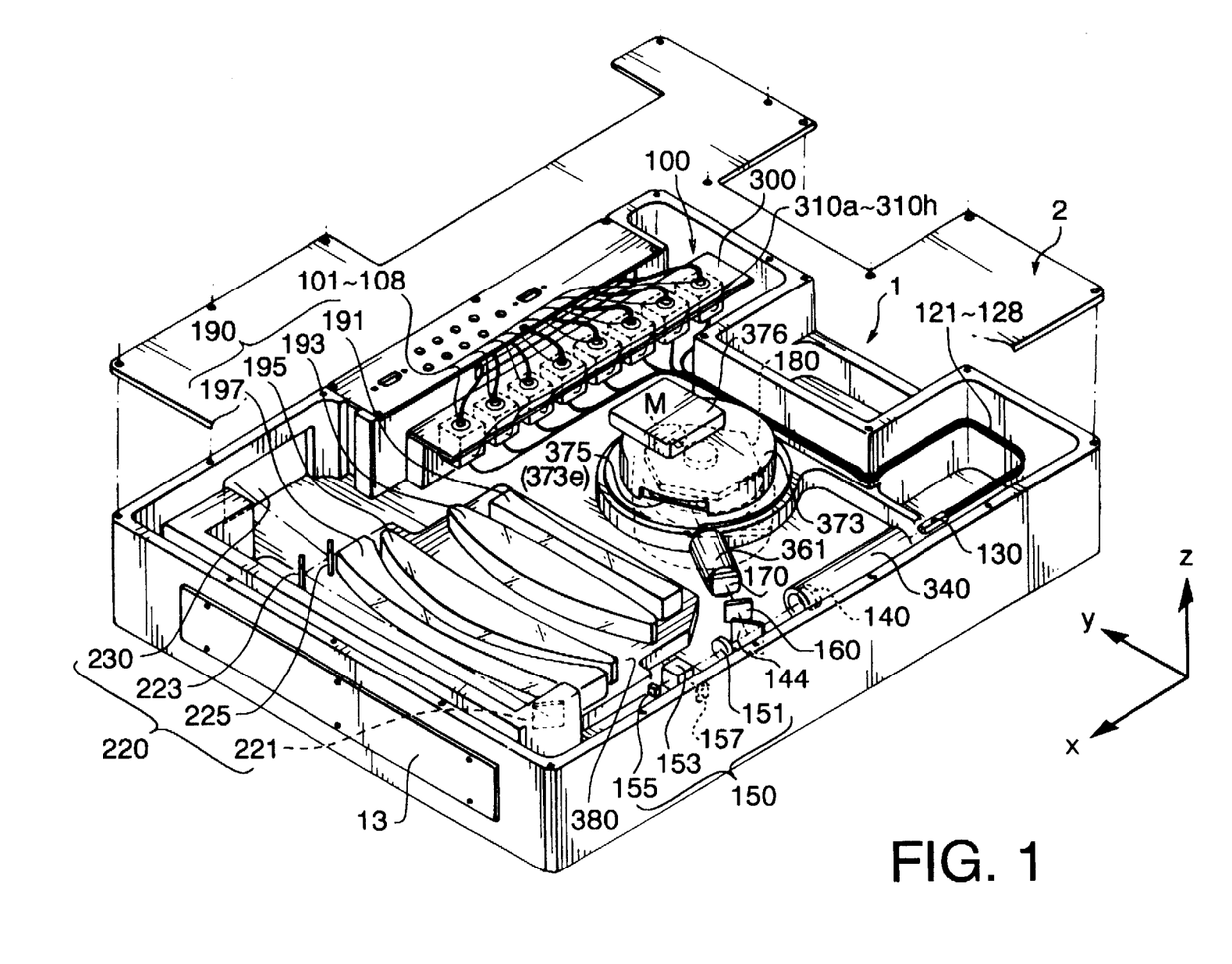
FIG. 1 is a perspective view showing a scanning optical device.
Figure 2:
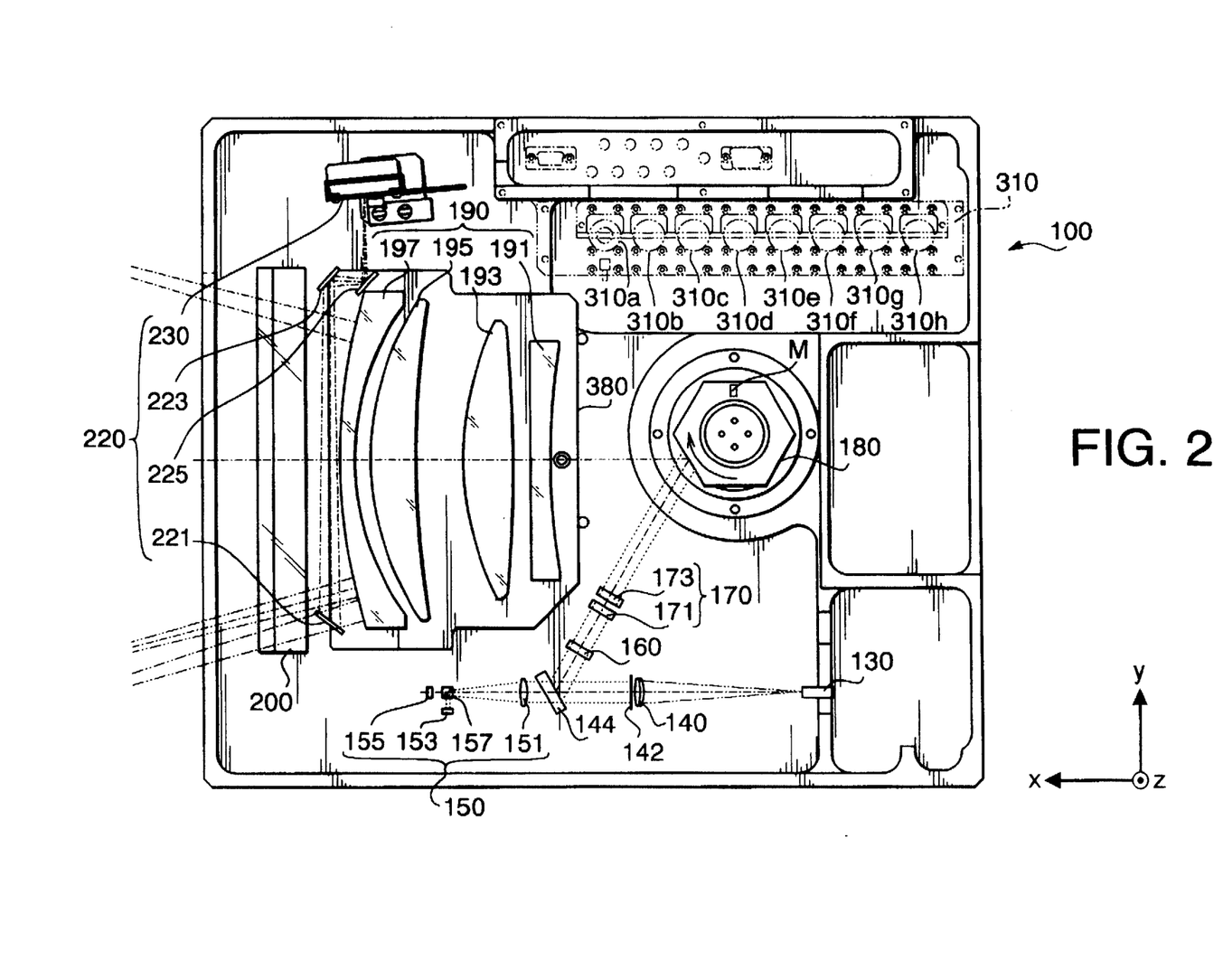
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
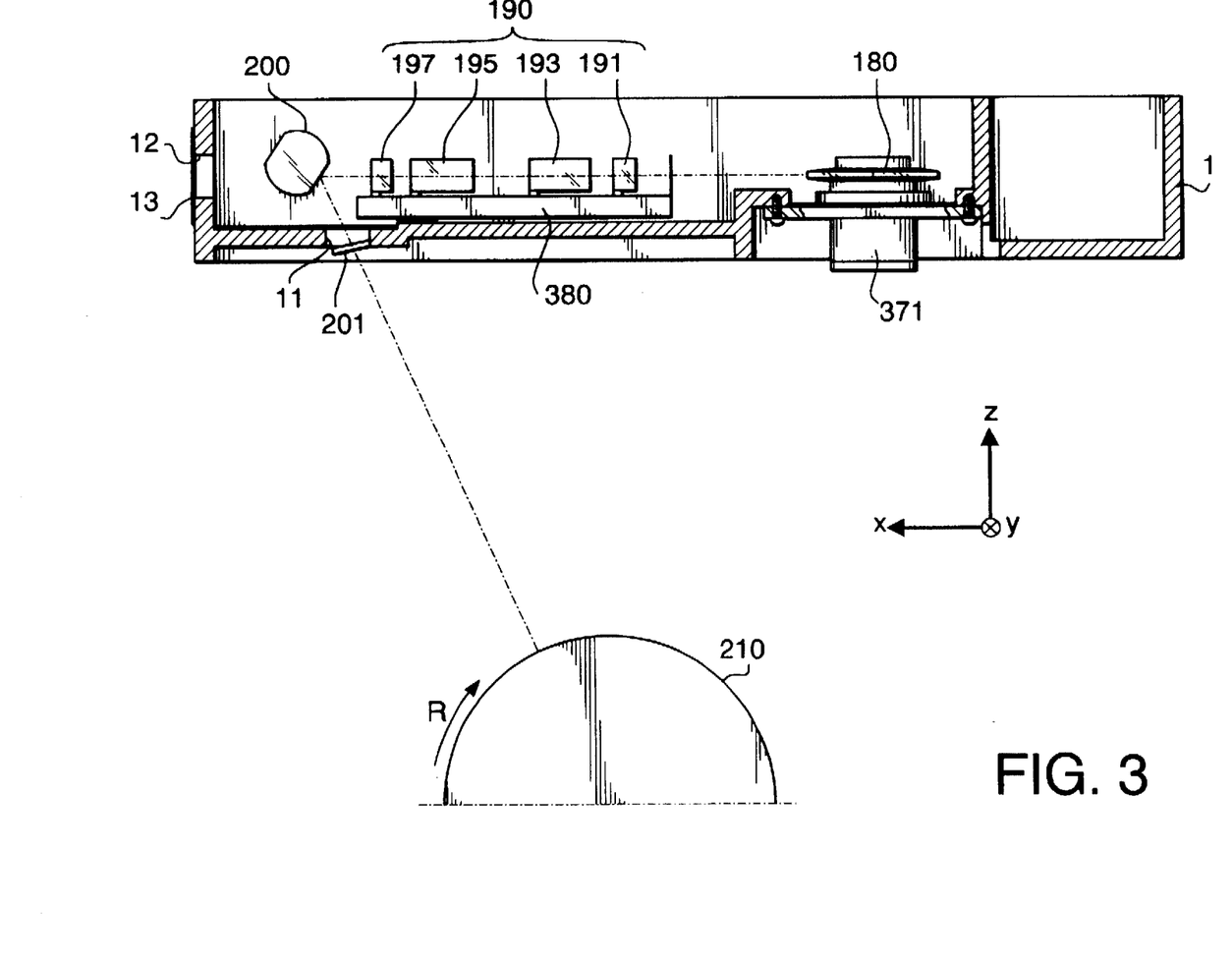
FIG. 3 is a cross-sectional view of the scanning optical device shown in FIG. 1 in an auxiliary scanning direction.
Figure 4:
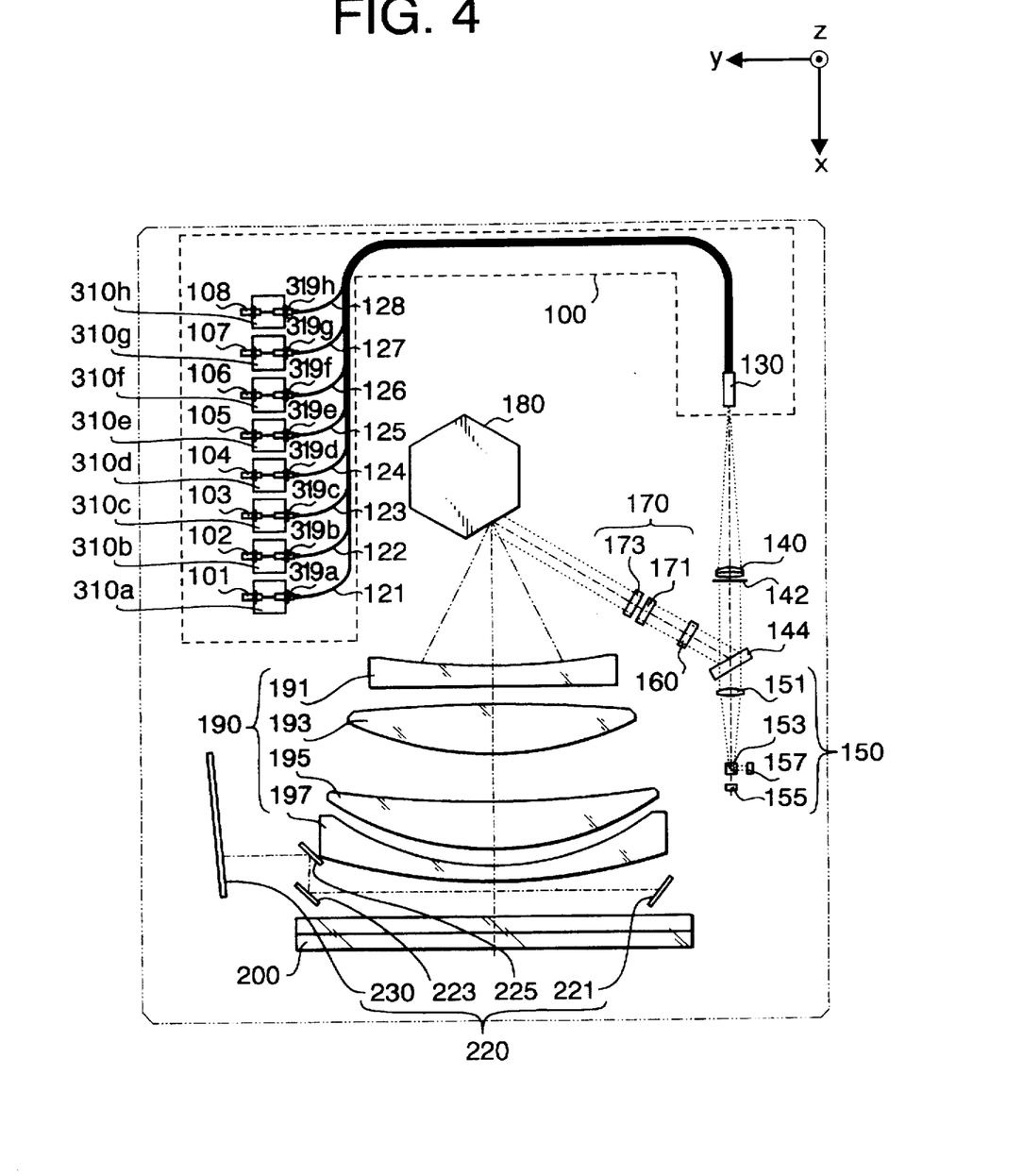
FIG. 4 shows the optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight laser fluxes are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a laser flux scans across the surface of a photoconductive member, and an "auxiliary scanning direction" is a direction in which the photoconductive member is translated or rotated to position the member for a subsequent main scan. The main scanning and auxiliary scanning directions are perpendicular to one another, and are both perpendicular to the optical axes of lenses guiding the laser fluxes. Since a laser flux typically is reflected or "folded" several times in the transmission from the light source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight

4 laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective laser fluxes are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point light sources are formed in a straight line.

A diverging light flux emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the light flux emitted from the collimate lens 140.

The light flux that passes through the aperture 142 is directed to a beam splitter 144. The beam splitter 144 splits the light flux causing a part of the light flux to be transmitted as a monitor light flux and the remaining part to be reflected as a main light flux. The transmissivity of the beam splitter 144 (i.e., the amount of light transmitted as a monitor flux) is, for example, from 5 to 10 percent as a mean value of S polarized light and P polarized light.

The monitor light flux is directed into an automatic power control (APC) sensor system 150. The APC sensor system 150 includes a collective lens 151 for converging the monitor flux; a polarization beam splitter 153 which splits the light flux into two linear polarization components that are orthogonal to each other; a first APC light receiving element 155; and a second APC light receiving element 157.

The first and second APC light receiving elements 155 and 157 detect the light energy of the respective linear polarization components, and the output of the light receiving elements 155 and 157 is used for a feedback control of the output of the semiconductor lasers 101 through 108.

The main light flux reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the flux in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main light flux transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIGS. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG. 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main flux transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main flux reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the light flux that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the fold-over mirror 200 side. The surfaces of the lens are designed such that the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 180 side and a convex toric surface on the fold-over mirror 200 side. The surfaces of the lens are designed such that the second lens 193 has a comparatively large positive (i.e. more positive) power in the auxiliary scanning direction and a comparatively small positive power in the main scanning direction.

The third lens 195 is a positive meniscus lens having two spherical surfaces.

The fourth lens 197 is a negative meniscus lens having two spherical surfaces.

The main flux transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the light fluxes reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight fluxes are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11, which permits the main flux (including the eight individual fluxes) reflected by the fold-over mirror 200 to be transmitted to the photoconductive drum 210 is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by a cover plate 13 in normal use.

Figure 5A:
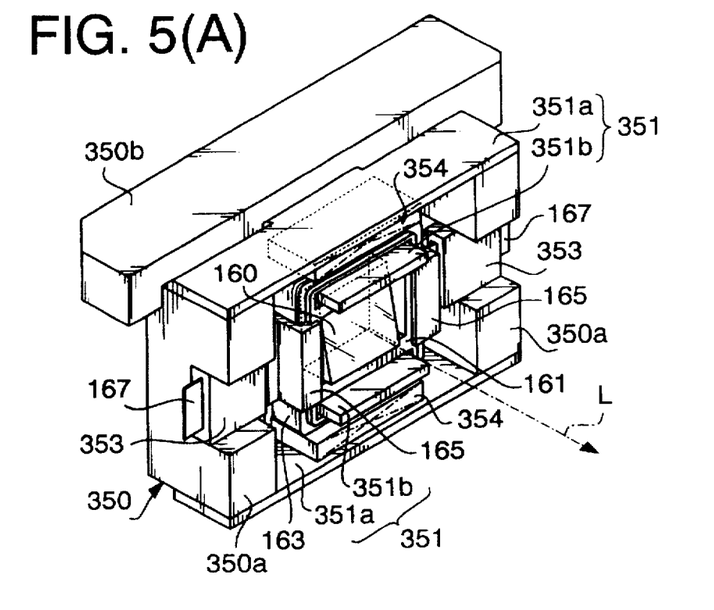
FIGS. 5(A) and 5(B) are perspective views which show the structure of a base block and a dynamic prism.
Figure 5B:
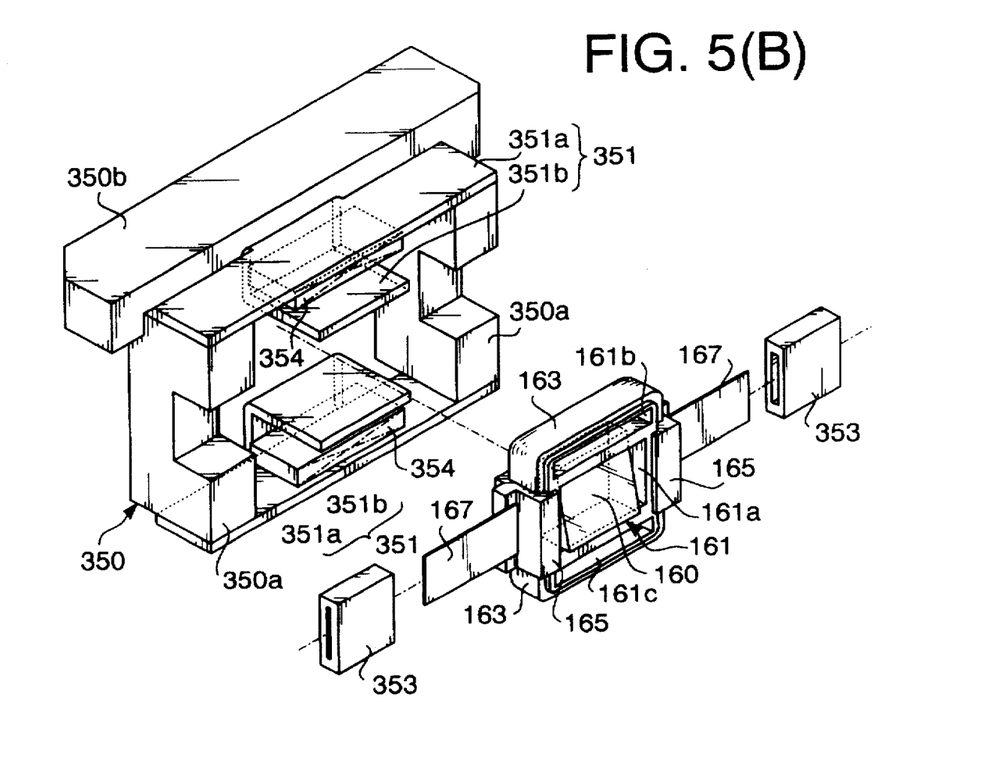

The arrangement of the dynamic prism 160 is now explained in detail with reference to FIGS. 5 to 8. FIG. 5(A) is a perspective view of a base block 350 for holding the dynamic prism 160 and FIG. 5(B) is an exploded view of the base block 350. The arrow L in FIG. 5(A) indicates the direction of propagation of the main flux from the beam splitter 144.

As shown in FIG. 5(B), a frame 161 is formed with a central through hole 161a, an upper through hole 161b positioned above the central through hole 161a, and a lower through hole 161c positioned below the central through hole 161a, each of which pass through the frame 161 in the optical axis direction. The dynamic prism 160 is supported in the frame 161 such that the dynamic prism 160 is positioned in the central through hole 161a. A coil 163, that acts as a driving mechanism, is wound around the frame 161. Two holding members 165, which hold the frame 161 and the coil 163 in an integral manner, are fixed to the sides of the frame 161 in a direction corresponding to the main scanning direction. The holding members 165 are provided with leaf springs 167, which extend outward.

The frame 161 that holds the dynamic prism 160 is supported by the base block 350 through the leaf springs 167 and the base block is fixed to the casing 1. As shown in more detail in FIGS. 6 and 7, the ends of the leaf springs 167 are passed through two guide members 353 and the guide members 353 are screwed onto two U-shaped arm parts 350a of the base block 350. The frame 161 (and the dynamic prism 160) is thus supported resiliently on the base block 350.

Figure 7:
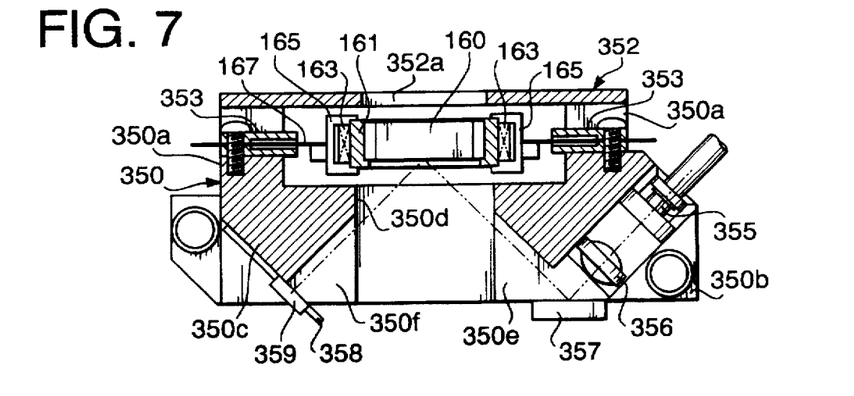
FIG. 7 is a cross section along line VII—VII of FIG. 6.
Figure 8:
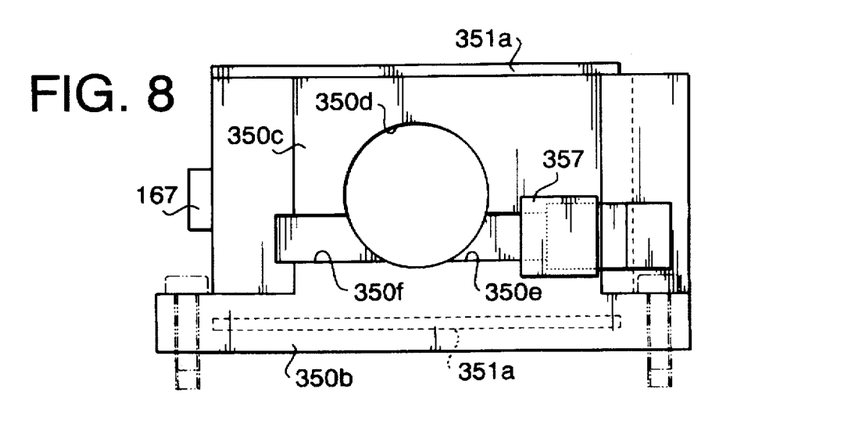
FIG. 8 is a rear view of the structure of the base block and the dynamic prism shown in FIGS. 5(A) and 5(B)

The base block 350 is comprised of the two U-shaped arm parts 350a, which support the leaf springs 167, a fixed part 350b, which is used for fixing the base block 350 to the casing 1, and a wall face part 350c, which extends from the fixed part 350b and is continuous with the arm parts 350a as shown in FIGS. 7 and 8.

Two yokes 351, made of iron plate, are fixed to the end faces (in the auxiliary scanning direction) of the arm parts 350a. Each yoke 351 is comprised of a board part 351a, which is disposed across the arm parts 350a, and a protruding plate part 351b, which extends from the central part of the board part 351a and is bent to form a surface that is parallel to, but separated from, the board part 351a by a predetermined distance. The protruding plate parts 351b are formed in a U-shaped manner such that the protruding plate parts 351b pass through the through holes 161b and 161c of the frame 161. A permanent magnet 354 is fixed to the part of each board part 351a that is opposite the protruding plate part 351b, and a magnetic circuit is formed in the space between the permanent magnet 354 and the protruding plate part 351b. The coil 163 is thus positioned inside this magnetic circuit. The upper and lower permanent magnets 354 are disposed with mutually differing poles facing the frame 161 and a magnetic circuit is formed in the vertical direction of FIG. 6.

When a current is passed through the coil 163, magnetic moments in the optical axis direction are generated at the upper and lower parts of the frame 161. Further, since the direction of the current flow relative to the magnetic circuits is opposite at each of the upper and lower parts, the moment that is generated will be opposite at each of the upper and lower parts of the frame 161. Thus, a force, which rotates dynamic prism 160 about a rotation axis, which is parallel to the main scanning direction, acts on frame 161. The dynamic prism 160 is thus rotated by an angle corresponding to the magnitude of the magnetic moment that further corresponds to the magnitude of the current applied to the coil 163.

In the above arrangement, the support of the dynamic prism 160 using the leaf springs 167 provides less non-linearity in the rotation motion than the case where a ball bearing or a slide bearing is used as the support. Thus, the ease and accuracy of control are improved. Also, by forming the leaf springs 167 from a conductive metal plate, these leaf springs 167 can also be used to supply electricity to the coil 163. By using an arrangement in which electricity is supplied via the leaf springs 167, the possibility of extra wires affecting the operation characteristics can be eliminated.

Figure 6:
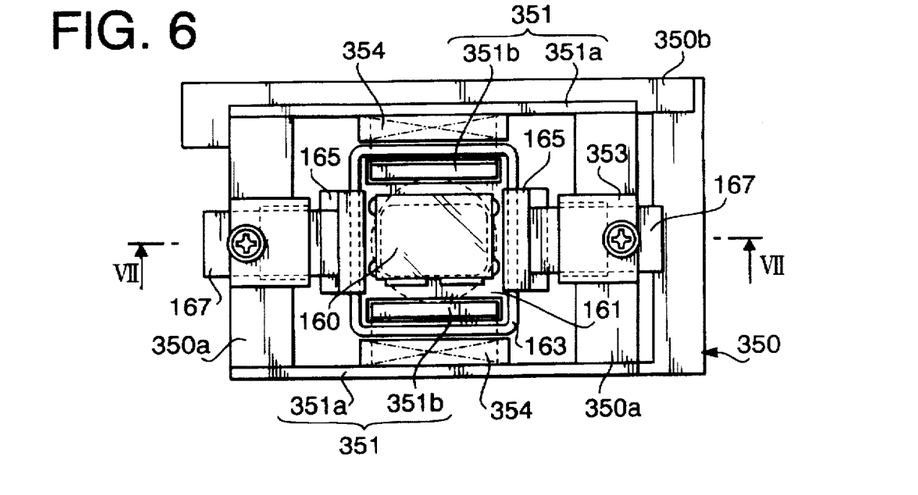
FIG. 6 is a front view of the structure of the base block and the dynamic prism shown in FIGS. 5(A) and 5(B)

Although not shown in FIGS. 5(A), 5(B) and 6, the sides of the arm parts 350a through which the laser flux passes are covered by a cover plate 352 and a wall face part 350c (as shown in FIG. 7). The cover plate 352 is formed to include a light path hole 352a through which the light flux passes. The wall face part 350c is also formed with a light path hole 350d, through which the light flux is incident on the prism. The wall face part 350c is further formed to include a first notched part 350e and a second notched part 350f, which provide a light path for optically detecting the rotation position of the dynamic prism 160.

As shown in FIGS. 7 and 8, the rotation position of the dynamic prism 160 is detected by a prism rotation sensor that includes a light emitting diode 355, a light projecting lens 356, a mirror 357, and a prism sensor 359. The light emitting diode 355 and the light projecting lens 356 are disposed in the first notched part 350e. The mirror 357 is provided in a position such that it reflects the detection light from the light emitting diode 355 towards the dynamic prism 160. The prism sensor 359 is mounted to a board 358 disposed in second notched part 350f, and receives the detection light reflected from the dynamic prism 160.

Figure 9:
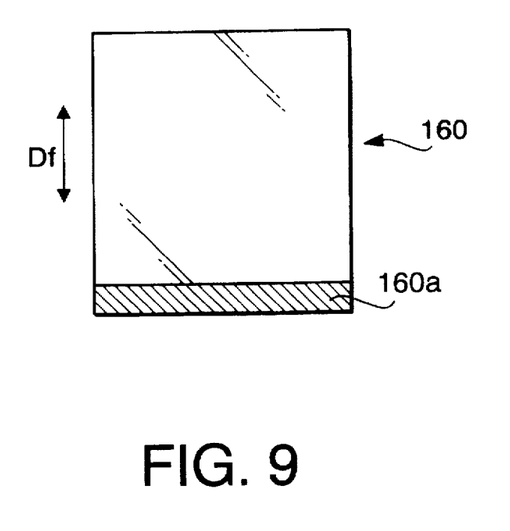
FIG. 9 is a front view of the dynamic prism.

As shown in FIG. 9, the dynamic prism 160 includes a mirror coated part 160a, at a position on which the detection light is incident, for reflecting the detection light. The mirror coated part 160a is formed on a periphery of the dynamic prism that is outside the range in which the main flux is incident. In FIG. 9, the symbol Df indicates a direction in which the laser beams are refracted by the dynamic prism 160 and that is parallel to the auxiliary scanning direction.

Figure 10:
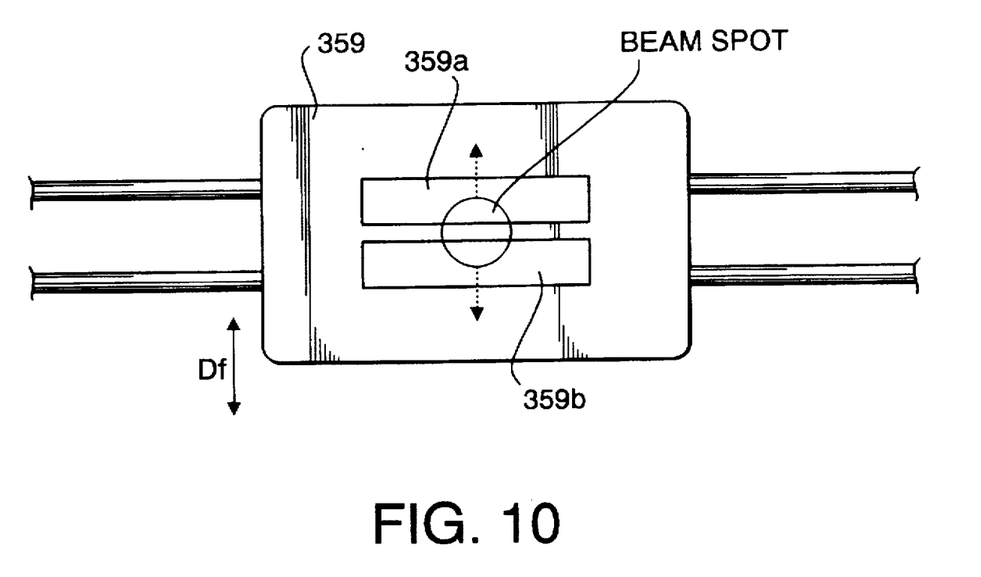
FIG. 10 is a plan view of a prism sensor.

As shown in FIG. 10, the prism sensor 359 includes two rectangular light receiving areas 359a and 359b, which are arranged lengthwise in a direction orthogonal to the direction Df. By determining the difference in the output signals from these light receiving areas 359a and 359b, the movement of the beam spot in the vertical direction, in other words, the rotation of the dynamic prism 160, can be detected. When current is not applied to the coil 163, the dynamic mirror 160 is set at the initial position and the beam spot of the detection light will be positioned at the center of the prism sensor 359 as shown in FIG. 10. In this condition, the output from the light receiving areas 359a and 359b will be equal and thus the differential signal will be zero.

If current is applied to the coil 163, the angle of the dynamic prism 160 changes, and the beam spot of the detection light moves in a direction orthogonal to the boundary between the light receiving areas 359a and 359b, as shown by the broken-line arrows in FIG. 10. A difference thus arises in the output of the light receiving areas 359a and 359b to give rise to a differential signal that corresponds to the rotation position of the dynamic prism 160. Therefore, the differential signal indicates the setting angle of the dynamic prism.

Since, in this example, the mirror coated part 160a of the dynamic prism 160 is eccentric from the rotation axis of the dynamic prism 160, the optical path length from the light emitting diode 355 to the prism sensor 359 will vary according to the rotation of the dynamic prism 160. The power of the light projecting lens 356 is set such that the light emitted from the light projecting lens 356 is substantially parallel light. As a result of the setting, a constant spot size can be kept on the prism sensor 359 in spite of a change of the optical path length due to the rotation.

Figure 11:
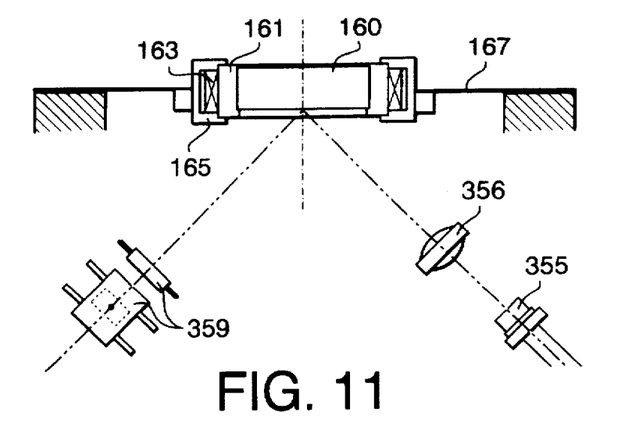
FIG. 11 is an explanatory diagram which shows a light path of detection light when the dynamic prism is in an initial condition.
Figure 12:
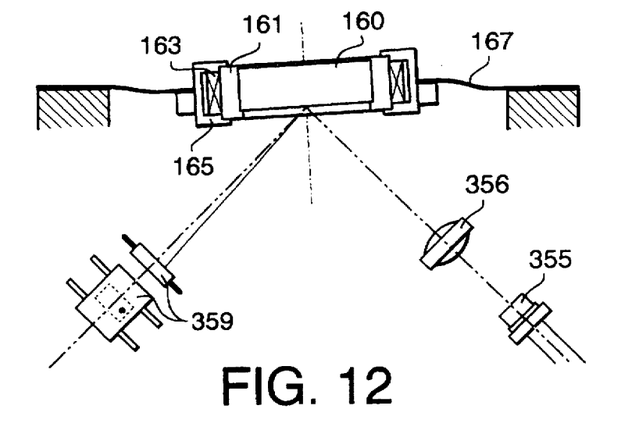
FIG. 12 is an explanatory diagram which shows a light path of detection light when the dynamic prism has been rotated.
Figure 13:
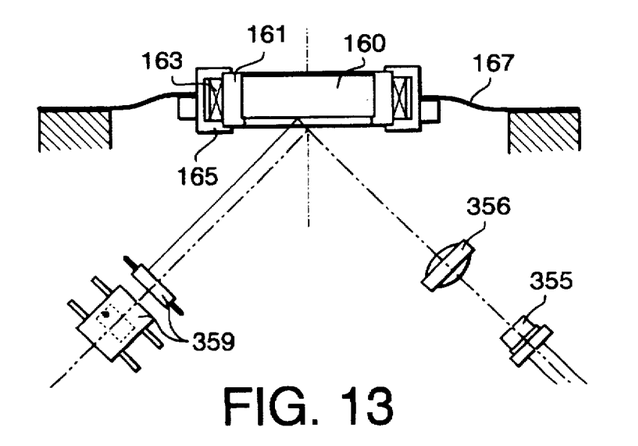
FIG. 13 is an explanatory diagram which shows a light path of detection light when the dynamic prism has been moved laterally.

FIGS. 11 to 13 illustrate the relationships between the position of the dynamic prism 160 and certain types of variation in the optical path of the detection light. For simplicity the mirror 357 has been omitted and the light path is illustrated in a developed manner.

As shown in FIG. 11, when current is not applied to the coil 163, the dynamic prism 160 is set at the initial position and the detection light falls on the center of the prism sensor 359. If an irregular resonance occurs, the dynamic prism 160 may be rotated about an axis in the auxiliary scanning direction. (i.e. an axis perpendicular to the surface of the paper) as shown in FIG. 12. or the dynamic prism 160 may move parallel to the direction of propagation of the laser flux as shown in FIG. 13. In these cases. the detection light beam spot on the prism sensor 359 will move along the boundary of light receiving areas 359a and 359b. Thus, in these cases, the differential output of the prism sensor 359 will not change such that the rotation angle of the prism can still be accurately detected.

That is, the prism sensor 359 only detects a rotation of the dynamic prism 160 in a direction in which the beam spot on the photoconductive drum 210 is shifted in the auxiliary scanning direction. In particular, other movements of the dynamic prism 160, for example, due to irregular resonance, do not change the output of the prism sensor 359, such that, the angular position of the dynamic prism 160 can be detected accurately.

In order to detect the regular rotation of the dynamic prism 160 without being affected by the irregular movement due to the irregular resonance or the like, it is preferable to use a sensor, such as the above-mentioned prism sensor 359, that only detects the movement of the detection light due to the regular rotation of the dynamic prism 160. A one-dimensional PSD (position sensing device) or the like could also be used instead of the prism sensor 359 of the above example.

Further, the amplitude of any irregular movement due to resonance can be minimized by optimizing the weight balance of the movable elements, including the dynamic prism 160, shown in FIG. 5(B), by making the total weight of each movable part small, or by increasing the stiffness of the leaf springs 167.

The control of the dynamic prism 160 is now described with reference to FIG. 14.

Figure 14:
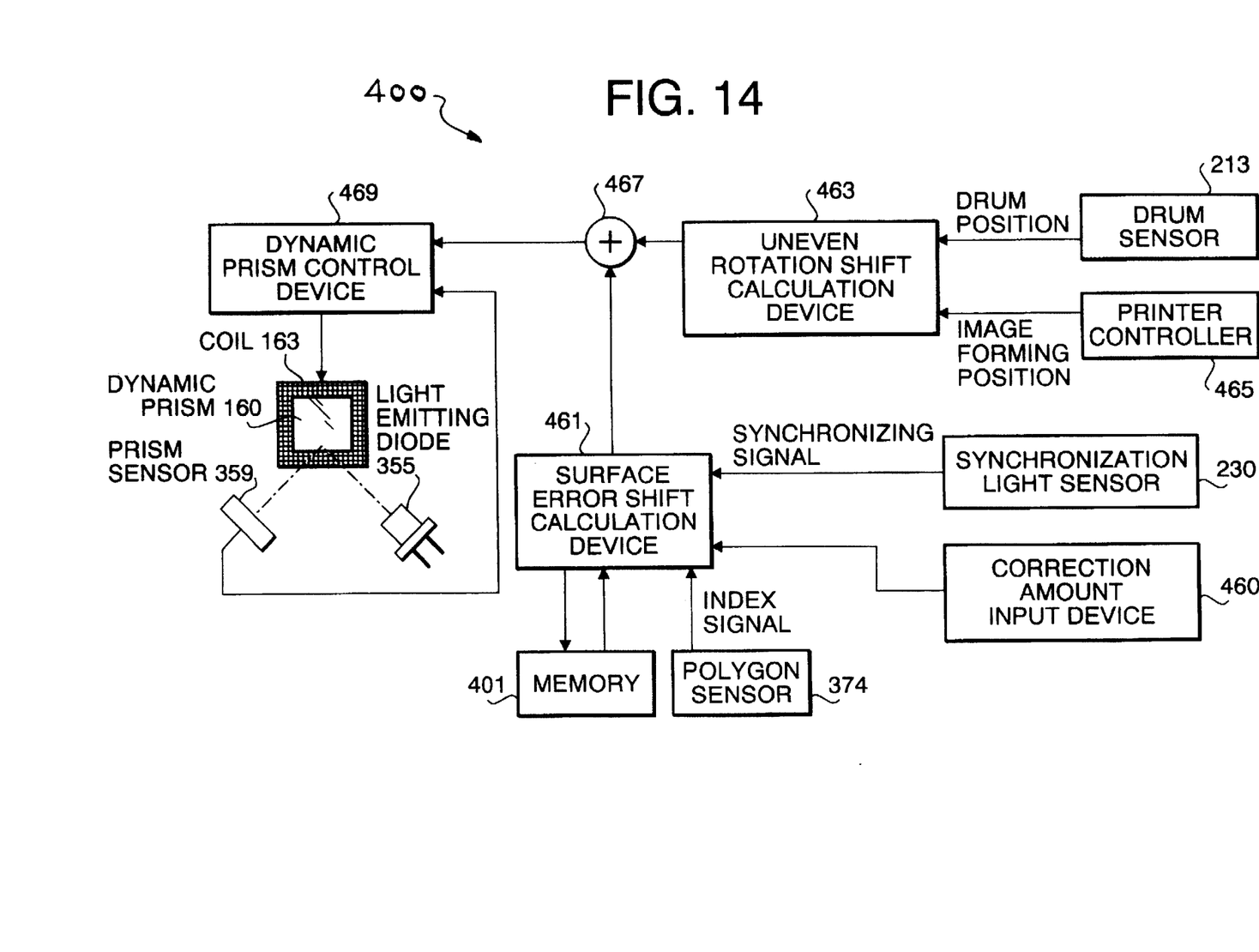
FIG. 14 is a block diagram which shows a part of the control system of the scanning optical device.

FIG. 14 is a block diagram that shows several parts of a control system 400 for the scanning optical device of the embodiment. The control circuit 400 controls the dynamic prism 160 to move the position of the beam spot on the photoconductive drum 210 in the auxiliary scanning direction in order to compensate for the shift of the beam spot due to both tilt errors of the reflecting surfaces of the polygon mirror 180, which occur periodically and for which the amounts are known in advance, and unevenness of rotation of the photoconductive drum 210, which occurs randomly during driving of the photoconductive drum 210.

A surface error shift calculation device 461 identifies which of the reflecting surfaces is currently used for scanning the laser flux based on the index signal output from the polygon sensor 374 and on the synchronizing signal output from the synchronization light sensor 230, and then outputs the amount of the shift of the beam spot due to the tilt error of the particular reflecting surface that is read from a memory 401.

As described above, the polygon sensor 374 may include, for example, a light emitting diode, which projects light towards the polygon mirror 180, and a light receiving element, which receives the light that is reflected by the polygon mirror 180. In the present embodiment, the mark M is made with a black, oil-based ink that makes the reflectivity of the marked part lower than the other parts such that the output of the light receiving element drops temporarily each time the mark M passes below the polygon sensor 374. The polygon sensor 374 outputs an index signal at the time the mark M passes below the polygon sensor 374.

The surface error shift calculation device 461 identifies which reflecting surface of the polygonal mirror is currently scanning the laser flux on the basis of the index signals from the polygon sensor 374 and horizontal synchronization pulses (HS), generated for each scan by detecting a signal output from the synchronization light sensor 230. In this case, because a single mark M is made on the polygon mirror 180, first a reflecting surface that corresponds to the mark M is identified by detecting the mark M. Thereafter, reflecting surfaces are identified by cyclically counting the number of horizontal synchronization pulses received between detections of the mark M.

Alternatively, the central control circuit 400 could also identify the reflecting surface that is currently deflecting the light beam by dividing the time interval between index signals by the number of reflecting surfaces.

The amount of shift of a beam spot on the photoconductive drum 210 based on the tilt error of each reflecting surface of the polygon mirror 180 can be determined by calculation after either independently measuring the tilt angle of each reflecting surface or actually measuring the differences among the respective reflecting surfaces for a beam spot at a predetermined point on the photoconductive drum 210 or an optically equivalent surface. The correction data that have been determined are input into the memory 401 through the surface error shift calculation device 461 using a correction amount input device 460. Since the correction amount input device 460 is only needed during adjustment, the correction amount input device 460 can be removed after the correction data have been input into the memory 401.

Conversely, since unevenness in the rotation of the photoconductive drum 210 is not a periodic error, but rather is generated at random, an uneven rotation shift calculation device 463 calculates the shifting of the beam spots (generated from the rotation unevenness) based on the output of the drum sensor 213 and a printer controller 465. The compensation of the deviation of the beam spot due to the unevenness of the rotation of the photoconductive drum 210 is effective when the average rotation speed is constant. That is, if the rotation speed is lower than a reference speed during a predetermined period, it must be higher than the reference speed during another period. The requirement of average rotation speed is necessary because the adjustable range of the dynamic prism is limited to a predetermined amount, and, if the deviation amount accumulated, there would be some point at which the deviation could not be compensated by the adjustment by the dynamic prism 160.

Since the relationship between the adjusting angle of the dynamic prism 160 and the movement of the beam spot is non-linear, it is impossible to independently calculate a first adjusting angle to correct the shift due to the surface error, and another adjusting angle to correct the shift due to rotation unevenness. Therefore, an adding circuit 467 synthesizes an amount of beam spot shifting by adding the amount of shifting of the beam spot due to tilt errors on the corresponding reflection surface to the amount of shifting of the beam spot due to the rotation unevenness. The adding circuit 467 outputs the adjusting angle of the dynamic prism 160 to counterbalance the synthesized amount of shifting of the beam spot, and the dynamic prism control device 469 controls the current to the coil 163 such that the dynamic prism 160 rotates to counterbalance (compensate for) the synthesized amount of shifting. The rotation angle of the dynamic prism 160 is detected by the prism sensor 359 to provide feed-back for closed-loop control by the dynamic prism control device 469.

Thus, even though the position of the scanning lines in the auxiliary scanning direction cannot be completely corrected by a combination of the cylindrical lens 170 and the fθ lens 190 and even if a rotation unevenness of the photoconductive drum 210 occurs, with the above control it is possible to accurately control the position of the scanning lines in the auxiliary scanning direction. The above correction is available even in the case where the linear image formed by the cylindrical lens 170 is apart from the reflecting surface of the polygon mirror 180 in order to avoid the influence of flaws or dust on the reflecting surface of the polygon mirror 180.

The dynamic prism 160 is rotated by the dynamic prism control device 469 between the end of a previous scan and the start of the image forming process. In order to secure this time for rotation control, the scan efficiency, in other words, the proportion of the image forming time with respect to the switching interval of the reflecting surfaces, is set to an appropriate value.

Although only shifts in the auxiliary scanning direction were subjected to correction in the present example, variations in the scanning speed of a beam spot due to curvature of the reflecting surfaces of the polygon mirror 180 in the main scanning direction may also be corrected for. In such an arrangement, the dynamic prism 160 could be disposed so as to rotate about an axis parallel to the auxiliary scanning direction and thus control the position of the beam spot in the main scanning direction.

Such an arrangement may be necessary since the curvature of a reflecting surface in the main scanning direction also generally differs for each reflecting surface. In a similar way to that described above for the auxiliary scanning direction, the amount that a beam spot is shifted due to the curvature varies according to the scan position in the main scanning direction. Thus, correction amounts (correction data) for each scan position in the main scan can be stored in memory 401 for each reflecting surface. Then, for correction, the reflecting surface that is currently deflecting the light flux is identified based on the index signal output from the polygon sensor 374 and the synchronizing signal output on each scan from the synchronization light sensor 230, and the scan position is determined according to the time from the rise of the synchronizing signal, such that the correction amount for the scan position and reflecting surface concerned is read out from the memory 401, and the dynamic prism 160 is rotated to correct the position of the beam spot in the main scanning direction.

Further, in the case where the characteristics of the fθ lens 190, for example, the constant-speed scanning characteristics, are not satisfactory, the beam spot on the surface of the photoconductive drum 210 could be shifted in the main scanning direction by the dynamic prism 160, in the same manner as the above, in order to either correct for the fθ characteristics alone or to correct for the fθ characteristics simultaneously with the surface error of the reflecting surface of the polygon mirror.

Figure 15:
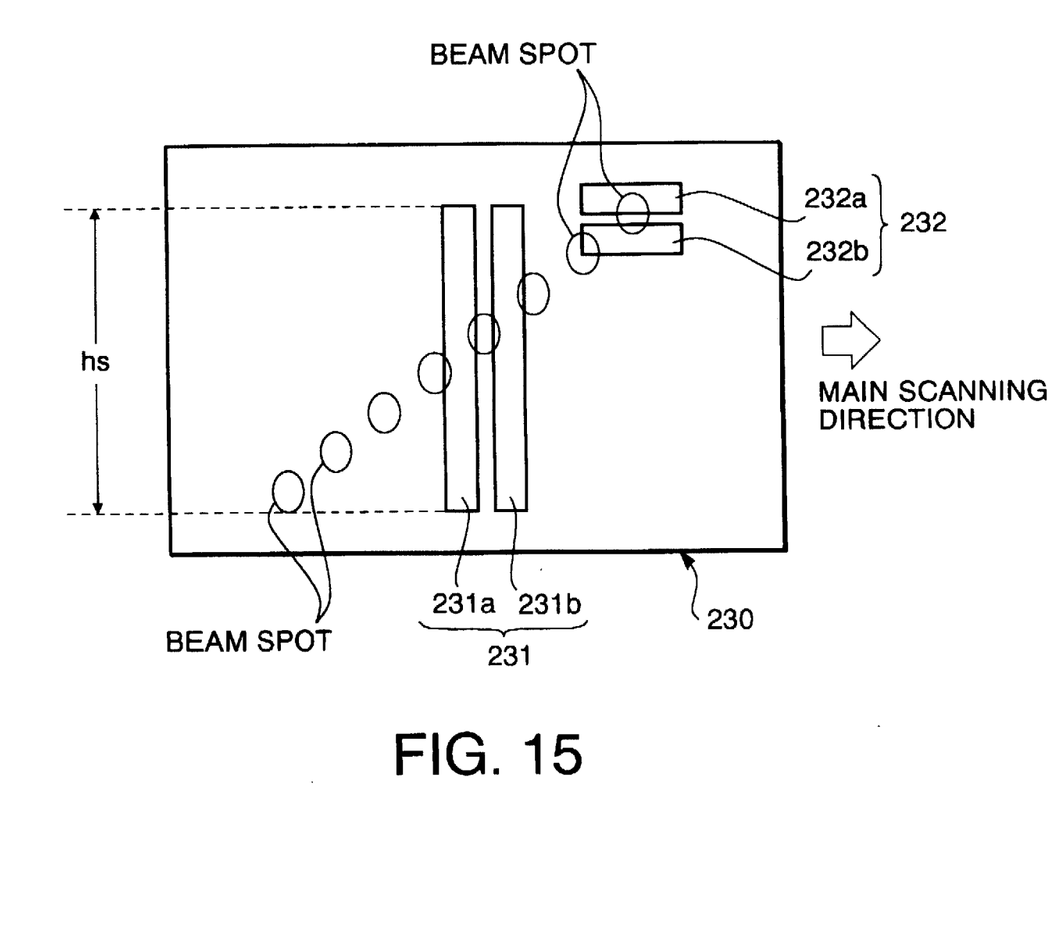
FIG. 15 is an explanatory diagram which shows the arrangement of a synchronization light sensor.

Lastly, the synchronization light sensor 230 shall be described in detail. As shown in FIG. 15, the synchronization light sensor 230 is provided with a main scanning position detection unit 231 for detecting a horizontal synchronizing signal and an auxiliary scanning position detection unit 232 for detecting a position of the light flux in the auxiliary scanning direction, through which the foremost beam spot passes. The main scanning position detection unit 231 is comprised of a first and second light receiving areas 231a and 231b, which are separated from each other in the main scanning direction, and the auxiliary scanning position detection unit 232 is comprised of a first and second light receiving areas 232a and 232b, which are separated from each other in the auxiliary scanning direction.

A horizontal synchronizing signal generating circuit (not shown) generates a horizontal synchronizing signal when the output from the first and second light receiving areas 231a and 231b of the main scanning position detection unit 231 become equal as a beam passes across the two areas. The use of two areas allows the rise of the signal to be sharper than in a case where the synchronizing signal is generated by an output signal from a single light receiving area. Further, deviations in the timing of the generation of the synchronizing signal due to variations in the amount of light received can be prevented.

For the particular scanning optical device of the present embodiment, since eight beams, which are spaced from each other by a predetermined interval in the main scanning direction, are scanned across the synchronizing signal detection light receiving element 230, eight horizontal synchronizing signals are output with a predetermined interval between each.

The auxiliary scanning position detection unit 232 is used to position the synchronization light sensor 230 with respect to the casing 1. In order to detect all eight beams, the height in the auxiliary scanning direction of the first and second light receiving areas 231a and 231b of the main scanning position detection unit 231 must cover the distribution range of the beams in the auxiliary scanning direction. However, since the response of the light receiving areas 231a and 231b becomes poorer as the area covered increases, it is important to set the height of the light receiving areas 231a and 231b of the main scanning position detecting unit 231 in the auxiliary scanning direction to a minimum height. Thus, to use the minimum height light receiving areas 231a and 231b, the synchronization light sensor 230 must be positioned very accurately.

The procedures for positioning the synchronization light sensor 230 are now explained.

First, the synchronization light sensor 230 is mounted roughly at a predetermined position on the casing 1. Next, a single predetermined semiconductor laser, in the present example, the semiconductor laser that forms the foremost beam spot, is driven and the angle of the polygon mirror 180 is adjusted so that the beam from the laser will strike the auxiliary scanning direction position detection unit 232. The position of the synchronization light sensor 230 in the auxiliary scanning direction is then adjusted while monitoring the outputs from the first and second light receiving areas 232a and 232b of the auxiliary scanning direction position detection unit 232 until the position at which these outputs are equal is reached. Further, the positional relationship between the main scanning position detection unit 231 and the auxiliary scanning position detection unit 232 is set so that the main scanning position detection unit 231 will cover the appropriate distribution range of the beam spots (in the auxiliary scanning direction) when the beam from the predetermined semiconductor laser coincides with the center of the auxiliary scanning position detection unit 232.

By thus providing the synchronization light sensor 230 with the auxiliary scanning position detection unit 232, the synchronization light sensor 230 can be positioned accurately with respect to the beam spots and a plurality of beams (in this case eight) can be detected without fail even in the case where the auxiliary scanning direction height of the light receiving areas for synchronizing signal detection is designed to be a minimum height with respect to the distribution range of the beams in order to increase the responsiveness.

As has been described above, with the present invention, shifts of the position of the beam spot on a scanned surface which vary over time, which are due to surface errors of the optical system, uneven rotation of the driving unit, or the like, are corrected by appropriate rotational control of a dynamic prism disposed between a light source and a polygonal mirror (deflector).

The use of a prism for the control of the position of a beam spot on the scanned surface is better than the use of a mirror, in that the use of a prism allows the sensitivity of the change of deflection angle with respect to the amount of rotation to be made lower than in the case where a mirror is used. In particular, the sensitivity can be selected suitably using the apex angle of the prism. With a prism, since the deflection angle can be controlled accurately through relatively rough adjustment of the prism, the accuracy burden placed on the driving system and detection system can be lessened.

Although the structure and operation of a scanning optical device is described herein with respect to the preferred embodiments, many modifications and changes can be made without departing from the spirit and scope of the invention.

The present disclosure relates to subject matter contained in Japanese Patent Application Nos. HEI 8-037266, filed on Jan. 31, 1996, and HEI 8-040605, filed on Feb. 2, 1996, which are expressly incorporated herein by reference in their entirety.

What is claimed is:

1. A scanning optical device, comprising:
    a light source that emits a light flux;
    a polygon mirror that deflects said light flux emitted from said light source;
    a scanning lens that converges said light flux deflected by said polygon mirror to form a beam spot on an image surface;
    a dynamic prism rotatably disposed between said light source and said polygon mirror, said dynamic prism controlling a direction of said light flux;
    a driving mechanism that rotates said dynamic prism to change a deviation angle of said dynamic prism;
    a controller that controls said driving mechanism to change a position of said beam spot; and
    a prism sensor that detects a position of said dynamic prism, said controller controlling said driving mechanism using a closed-loop control based on an output of said prism sensor, said prism sensor comprising a light emitting portion that emits a light beam toward a surface of said dynamic prism and a light receiving portion that receives a light beam reflected from said surface, said light receiving portion including a light receiving element provided with two light receiving areas divided by a boundary perpendicular to a moving direction of said reflected light due to a regular rotation of said dynamic prism by said driving mechanism.

2. The scanning optical device according to claim 1, wherein said dynamic prism is disposed in an afocal optical path.

3. The scanning optical device according to claim 1, wherein said light receiving areas are rectangular and have long sides that are parallel the said boundary.

4. The scanning optical device according to claim 1, wherein said dynamic prism is supported by an elastic member.

5. The scanning optical device according to claim 4, wherein said elastic member comprises a leaf spring.

6. The scanning optical device according to claim 1, wherein said dynamic prism controls said direction of said light flux in an auxiliary scanning direction.

7. The scanning optical device according to claim 6, wherein said controller controls said driving mechanism in order to compensate said deviation angle of said beam spot due to tilting errors of reflecting surfaces of said polygon mirror.

8. The scanning optical device according to claim 1, wherein said controller controls said driving mechanism in order to compensate said deviation angle of said beam spot due to at least one of a tilt error of a reflecting surface of said polygon mirror and an unevenness of rotation of said image surface.

9. The scanning optical device according to claim 1, wherein said image surface comprises a photoconductive drum and wherein said controller controls said driving mechanism in order to compensate for deviations of said beam spot due to unstable rotation of said photoconductive drum.

10. The scanning optical device according to claim 1, wherein said controller controls said driving mechanism in order to compensate for deviations of said beam spot due to a tilt error of a reflecting surface of said polygon mirror.

11. The scanning optical device according to claim 1, wherein said controller controls said driving mechanism in order to compensate for deviations of said beam spot due to unevenness of rotation of said image surface.

12. A scanning optical device, comprising:
    a light source that emits a light flux;
    a polygon mirror that deflects said light flux emitted from said light source;
    a scanning lens that converges said light flux deflected by said polygon mirror to form a beam spot on an image surface;
    a dynamic prism rotatably disposed between said light source and said polygon mirror, said dynamic prism controlling a direction of said light flux;
    a driving mechanism that rotates said dynamic prism to change a deviation angle of said dynamic prism; and
    a controller that controls said driving mechanism to change a position of said beam spot, wherein said dynamic prism is held by a prism holder, said prism holder being rotatably supported by a frame, wherein said driving mechanism comprises a magnet fixed to said frame to form a magnetic circuit and a coil that surrounds said prism holder to generate a magnetic moment with respect to said magnetic circuit.

13. The scanning optical device according to claim 12, wherein said prism holder is supported by a metal leaf spring with respect to said frame, an electric current being supplied to said coil via said metal leaf spring.

14. A scanning optical device, comprising:
    a light source that emits a light flux;
    a polygon mirror that deflects said light flux emitted from said light source;
    a scanning lens that converges said light flux deflected by said polygon mirror to form a beam spot on an image surface;
    a dynamic prism rotatably disposed between said light source and said polygon mirror, said dynamic prism controlling a direction of said light flux;
    a driving mechanism that rotates said dynamic prism to change a deviation angle of said dynamic prism;
    a controller that controls said driving mechanism to change a position of said beam spot;
    an index signal generator that generates an index signal per rotation of said polygon mirror; and a memory that stores data corresponding to shape errors of reflecting surfaces of said polygon mirror, wherein said controller controls said driving mechanism in order to compensate for deviations of said beam spot due to shape errors for each individual reflecting surface of said polygon mirror, said controller determining which reflecting surface is used to deflect said light flux based on said index signal, said controller controlling said driving mechanism in accordance with data of a used reflecting surface read from said memory.

* * * * *